UNITED STATES PATENT OFFICE.

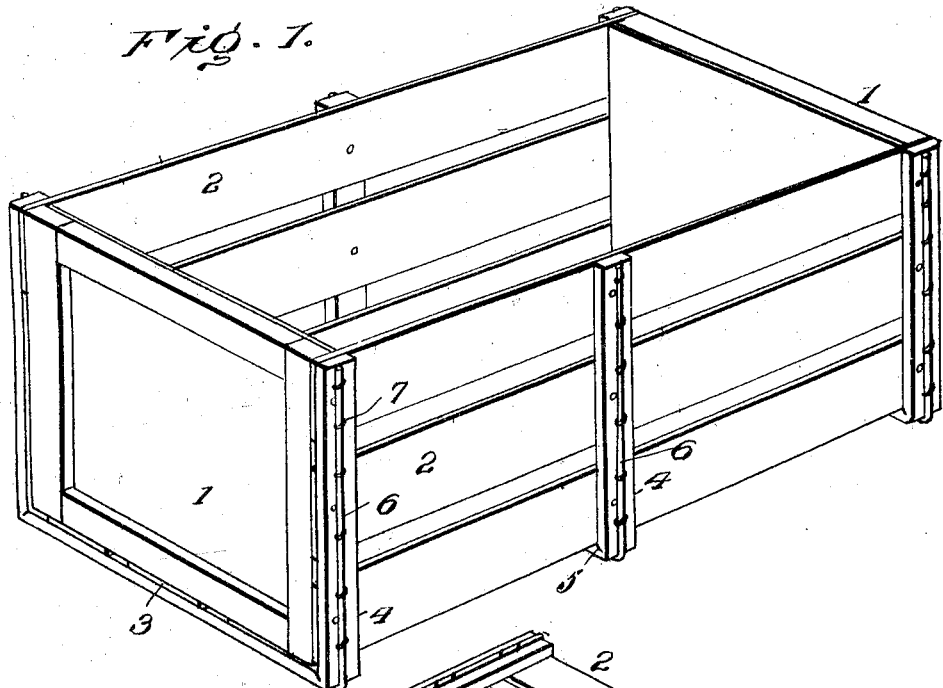
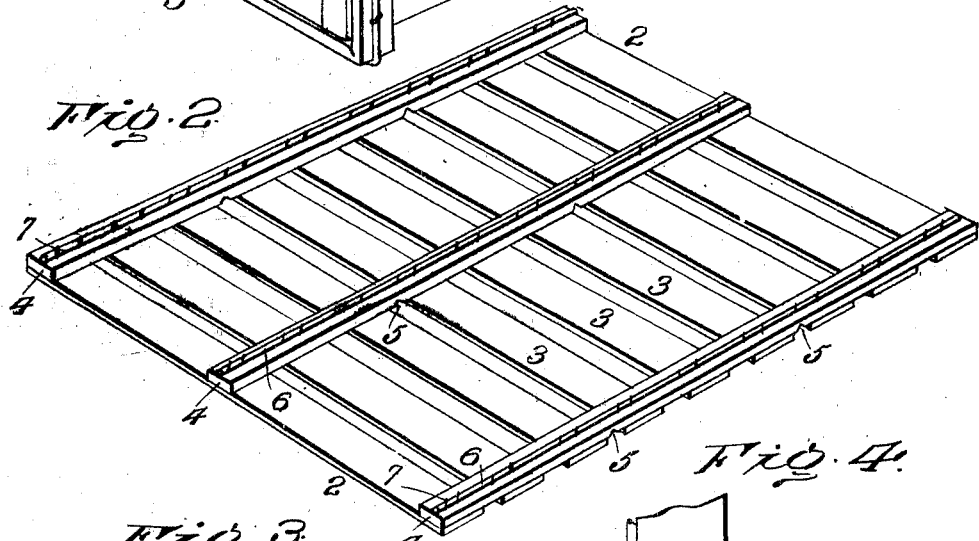
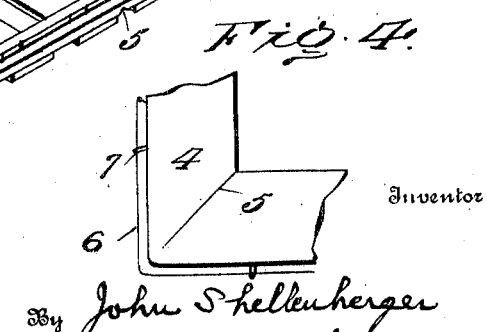

JOHN SHELLENBERGER, OF ROME, GEORGIA.

FRUIT-CRATE.

No. 811,449.　　　Specification of Letters Patent.　　　Patented Jan. 30, 1906.

Application filed May 31, 1905. Serial No. 263,129.

*To all whom it may concern:*

Be it known that I, JOHN SHELLENBERGER, a citizen of the United States, residing at Rome, Floyd county, Georgia, have invented certain new and useful Improvements in Fruit-Crates; and I do hereby declare the following to be a full, clear, and exact description of the invention, such as will enable others skilled in the art to which it appertains to make and use the same.

This invention relates to certain improvements in wooden boxes or crates, and more particularly relates to improvements in fruit-crates.

The parts of fruit-crates are commonly assembled and often carelessly nailed together on the farm or in the orchard during the rush of the harvest or picking season, and often the bottom slats are not properly fastened to the crate-ends nor the sides properly nailed to the edges of the bottom slats or to the crate-ends. Consequently the bottom or side slats of the filled crates often bulge or loosen while the crates are being possibly roughly handled during the process of loading and unloading cars and trucks, permitting the fruit to drop out and waste or become damaged. When crates of fruit reach the wholesale market, each crate is usually opened for inspection by prying off a side thereof, thereby often breaking the sides, so that they cannot be properly renailed to the crate, and the sides are often so carelessly renailed as to become loose and permit leakage and loss.

It is an object of my invention to provide a simple and efficient fruit-crate of an improved construction which can be shipped in knocked-down condition and can be easily and quickly assembled and nailed up on the farm or in the orchard without requiring skilled labor and which is designed to avoid the difficulties hereinbefore recited.

A further object of the invention is to provide an improved fruit-crate wherein the slats of the sides and bottom are all secured to and connected by cross-pieces or battens formed to bend at the junctions between the sides and bottom, the battens having connections, such as wires or cords, secured thereto practically throughout the lengths thereof to tie the bottoms and sides of the crate together and form flexible connections between the sides and bottom.

The invention consists in certain novel features in construction or in combinations and arrangements of parts, as more fully and particularly described hereinafter.

Referring to the accompanying drawings, which show what I now consider my preferred embodiment as an example for purposes of explanation from among other constructions within the spirit and scope of my invention, Figure 1 is a perspective view of a crate constructed in accordance with my invention, the crate-top not being shown. Fig. 2 is a perspective view of the flat sheet or series of slats and battens as shipped from the factory and which is adapted to be bent and secured around three edges of the crate ends to form the bottom and two sides. Fig. 3 is an edge view, on an enlarged scale, showing a portion of a batten having a V cut forming a bending-line. Fig. 4 is an enlarged edge view showing the angle portion of the batten after being bent to pass from the bottom upwardly at a side of the crate.

In the drawings I show a rectangular or oblong crate having the two similar crate ends and the sides and bottom. Each crate end 1 is shown of the panel type, consisting of a rectangular open frame having a sheet of thin stuff or veneer secured to one face of the frame and closing the same. However, I do not wish to limit my invention to such specific type of crate end. The opposite crate sides are formed by the spaced parallel longitudinal slats 2, and the crate-bottom is formed by the parallel spaced longitudinal slats 3. These slats 2 3 are preferably approximately similar and about equally spaced and are united and secured together by the cross-pieces or battens 4. The slats to form the two sides and bottom of a crate can at the factory be arranged in a horizontal series, (see Fig. 2,) and three parallel battens 4 are arranged longitudinally of the series and across and nailed or otherwise firmly secured to each slat, so that battens are arranged across the ends of the slats and another batten across the central portion of each slat. Each batten is weakened at the transverse lines where the horizontal or bottom portion thereof meets the vertical or side portions of the batten. For instance, I show each batten with two V-shaped grooves 5 cut transversely across the inner face of the same and at the points where the batten bends from the bottom to the sides of the crate. Each batten throughout its length and at its outer face has a wire, cord, or the like 6 firmly secured thereto by nails, staples 7, or other suitable means usually arranged at close intervals. These flat sheets or series of connected slats are thus made up at the factory and can be shipped very conveniently and economically with the crate ends in their flat or knocked-down condition. The flat sheet or series of slats is then bent around three edges of each crate end to form two sides and the bottom of the crate, and, if desired, the flat sheet or series can be formed sufficiently long or of a sufficient number of slats to also bend over and form the crate-top. The slats are firmly nailed to the crate ends, the nails passing through the end battens and slat ends into the edges of the frames of the crate ends, forming a strong construction. The battens bend along the transverse bending-lines 5, which are located at the outer edges of the crate-bottom and the lower edges of the crate sides. The wires 6 extend throughout the length of each batten, down one crate side, across the crate-bottom, and up the other crate side, and hence said wires bridge or extend across the bends or breaks in the battens at the junctions between the sides and bottom. The crate-bottom is thus secured by the wires on the battens to the sides against such loosening or downward bulging as to permit leakage of the fruit even though the bottom is imperfectly nailed to the crate ends. The wires on the battens will also hold the sides against complete separation from the crate when a side is pried off to permit inspection and will also hold the side against springing out at the lower edge if imperfectly nailed to the crate ends. The staples or other means securing the wires to the battens can also extend through and secure the battens to the slats.

The slats are preferably spaced to afford openings for ventilation, and the battens not only protect the slats and form a strong structure, but they coöperate with the wires in forming a most durable and effective crate for the purposes intended. The battens having the weakened bending-lines bend at the junctions between the sides and bottom and form strong right-angle corners or joints between the sides and bottom, and the middle or intermediate batten and its wire hold the central portions of the sides and bottom against bulging and avoid the necessity of nailing the crate sides to the edges of the crate-bottom. Each transverse or cross cut 5 extends almost through the batten—say about three-fourths of the distance through the batten—and the sides of the cut are arranged about at right angles to each other. Hence when the batten is bent at right angles the walls of the V cut will come together, forming what might be termed a "miter-joint." The extreme bottom of the cut is usually somewhat rounding, and a sufficient thickness of the batten is left at the bottom of the cut to permit bending of the batten along said reduced line, preferably without breaking. (See Figs. 3 and 4.) The wire 6, bridging the joint, tends to prevent severing of the batten in bending and forms a protective connection from one side of the bend to the other. The several wires also form flexible connections between the sides and bottom on which a side can swing when loosened and swung from the crate during inspection and which aid in preventing the battens breaking through when a side is swung open and which also uphold the bottom in the event that one or more battens do break through at the cuts. The middle batten and its wire, in connection with the end battens, firmly uphold the crate-bottom and prevent vertical springing or vibration of the central portion of the bottom, which in the crates commonly used causes injury to the fruit located over the central portion of the crate-bottom.

The wires are not employed to merely strengthen or brace the crate, but coöperate with the battens to bridge the cut bent portions thereof and uphold the crate-bottom and provide flexible connections for the sides when opened for inspection. The term "wire" is employed herein to include cord and equivalent flexible binding material.

What I claim is—

1. A fruit-shipping crate comprising end heads, longitudinal-spaced bottom and side slats secured to said end heads, opposite end and intermediate parallel battens fitting the outer faces of and crossing and secured to said side and bottom slats and bent transversely to extend from the bottom slats upwardly across the side slats, and wires arranged longitudinally along the outer faces of said battens and secured thereto approximately throughout the lengths thereof, substantially as described.

2. In combination, in a ventilated fruit-shipping crate, end heads, a bottom and sides composed of spaced longitudinal slats secured to said end heads, battens secured to and extending across the slats and arranged at the outer faces thereof, each batten formed with transverse cuts across its inner side and extending the greater portion of the distance through the batten, each batten bent at said cuts to extend from the crate-bottom upwardly along the sides of the crate, the walls of each cut abutting against each other to form a miter-joint, and wires secured to the battens and extending longitudinally thereof and bridging said joints, substantially as described.

3. A shipping-crate comprising end heads, and a bottom and sides lapping and secured to the edges of said end heads, said bottom and sides consisting of longitudinal slats, and several battens secured to the slats and arranged at the outer faces thereof, each batten extending transversely across the bottom and upwardly across the sides and having tapered cuts extending across the same forming miter-joints at the junctions between the sides and bottom and a wire secured longitudinally to the batten and bridging said joints, substantially as described.

4. As an article of manufacture, a flat sheet or series of slats adapted to be bent around and secured to crate ends to form the bottom and sides thereof and consisting of a series of separated or spaced longitudinal slats, and several battens extending across and secured to the outer faces of said slats, each batten at its inner face, between certain slats, having transverse flaring cuts extending the greater portion of the distance through the batten, and longitudinal wires secured along the outer faces of the battens approximately throughout the lengths thereof, substantially as described.

In testimony whereof I affix my signature in presence of two witnesses.

JOHN SHELLENBERGER.

Witnesses:
 GEO. L. BROWN,
 C. S. SPARKS.